United States Patent
Huang

(10) Patent No.: US 7,032,785 B1
(45) Date of Patent: Apr. 25, 2006

(54) CAULKING GUN HAVING ANGLE ADJUSTMENT FUNCTION

(75) Inventor: Chi-Chuan Huang, Changhua Hsien (TW)

(73) Assignee: Kai Shyun Enterprise Co., Ltd., Fuhsing Hsiang (TW)

( * ) Notice: Subject to any disclaimer, the term of this patent is extended or adjusted under 35 U.S.C. 154(b) by 29 days.

(21) Appl. No.: 10/919,712

(22) Filed: Aug. 17, 2004

(51) Int. Cl.
*B67D 5/42* (2006.01)
*G01F 11/00* (2006.01)

(52) U.S. Cl. .................. 222/391; 222/145.1; 222/160; 74/169; 74/141.5; 74/148; 74/531; 609/209; 254/106

(58) Field of Classification Search ............... 222/391, 222/145.4, 160; 74/169, 148, 141.5, 155, 74/128, 126, 129, 111, 531; 604/209
See application file for complete search history.

(56) References Cited

U.S. PATENT DOCUMENTS

| 2,305,238 | A | * | 12/1942 | Coates | 74/169 |
| 2,367,346 | A | * | 1/1945 | Good | 74/169 |
| 4,171,072 | A | * | 10/1979 | Davis, Jr. | 222/326 |
| 4,509,662 | A | * | 4/1985 | Weiss | 222/391 |
| 2004/0124215 | A1 | * | 7/2004 | Mayer | 222/391 |

* cited by examiner

*Primary Examiner*—Michael Mar
*Assistant Examiner*—Stephanie E. Tyler
(74) *Attorney, Agent, or Firm*—Alan D. Kamrath; Nikolai & Mersereau, P.A.

(57) ABSTRACT

A caulking gun includes a gun body, a push rod, a push plate, an adjusting knob, and a piston lever. Thus, the adjusting knob is rotated to move away from the push plate to increase the incline angle of the push plate, so that the push plate is locked on the push rod in a tilt manner to lock and move the push rod without having to replace the push plate, thereby enhancing the lifetime of the caulking gun.

14 Claims, 7 Drawing Sheets

CAULKING GUN HAVING ANGLE ADJUSTMENT FUNCTION

BACKGROUND OF THE INVENTION

1. Field of the Invention

The present invention relates to a caulking gun, and more particularly to a caulking gun having an angle adjustment function.

2. Description of the Related Art

A conventional caulking gun in accordance with the prior art shown in FIGS. 7 and 8 comprises a gun body 60 having a first end formed with a mounting hole 63 and a second end formed with a handle 61, a push rod 80 movably mounted on the gun body 60 and extended through the mounting hole 63 of the gun body 60, a push plate 90 mounted on the push rod 80 in an inclined manner and having a first end formed with a locking hole 91 rested on the push rod 80, an elastic member 82 mounted on the push rod 80 and biased between the gun body 60 and the push plate 90, a piston lever 64 pivotally mounted on the gun body 60 and having an end provided with a link 65 rested on a second end 92 of the push plate 90 to push the push plate 90 to move, a barrel 70 mounted on a side of the gun body 60 and having an inside formed with a receiving chamber 71, a pull knob 81 mounted on a first end of the push rod 80, a catch plate (not shown) mounted on a second end of the push rod 80 and movably mounted in the receiving chamber 71 of the barrel 70, and a cartridge (not shown) containing silicone received in the receiving chamber 71 of the barrel 70 and rested on the catch plate.

When the piston lever 64 is pressed, the link 65 of the piston lever 64 is urged on the second end 92 of the push plate 90 to push the push plate 90 to move forward in an inclined manner. Thus, the locking hole 91 of the push plate 90 is locked on the push rod 80 in a tilt manner to move the push rod 80 which moves the catch plate to compress the cartridge. After the piston lever 64 is released, the push plate 90 is pushed by the restoring force of the elastic member 82 to move backward in a horizontal manner without moving the push rod 80. Thus, the push rod 80 and the catch plate are moved forward successively by pressing the piston lever 64 repeatedly to compress the cartridge so as to squeeze the silicone outward from the cartridge for use.

However, when the locking hole 91 of the push plate 90 is worn out during a long-term utilization, the diameter of the locking hole 91 of the push plate 90 is expanded, so that the locking hole 91 of the push plate 90 cannot lock the push rod 80 to move the push rod 80. Thus, the conventional caulking gun cannot be used when the locking hole 91 of the push plate 90 is worn out, thereby decreasing the lifetime of the conventional caulking gun.

SUMMARY OF THE INVENTION

In accordance with the present invention, there is provided a caulking gun, comprising:
a gun body having a first end formed with a mounting hole;
a push rod movably mounted on the gun body and extended through the mounting hole of the gun body;
a push plate mounted on the push rod in an inclined manner to push the push rod to move and having a first end formed with a locking hole rested on the push rod;
an adjusting knob rotatably and movably mounted in the mounting hole of the gun body and rested on a first side of the first end of the push plate; and
a piston lever pivotally mounted on the gun body and having an end provided with a link rested on a second end of the push plate to push the push plate to move.

The primary objective of the present invention is to provide a caulking gun having an angle adjustment function.

Another objective of the present invention is to provide a caulking gun, wherein the adjusting knob is rotated to move away from the push plate to increase the incline angle of the push plate, so that the push plate is locked on the push rod in a tilt manner to lock and move the push rod without having to replace the push plate, thereby enhancing the lifetime of the caulking gun.

A further objective of the present invention is to provide a caulking gun, wherein the adjusting knob is rotated to move away from the push plate to increase the forward stroke of the push plate or to move toward the push plate to decrease the forward stroke of the push plate so as to adjust the output flow rate of the silicone from the cartridge.

Further benefits and advantages of the present invention will become apparent after a careful reading of the detailed description with appropriate reference to the accompanying drawings.

DETAILED DESCRIPTION OF THE INVENTION

Figure 1:
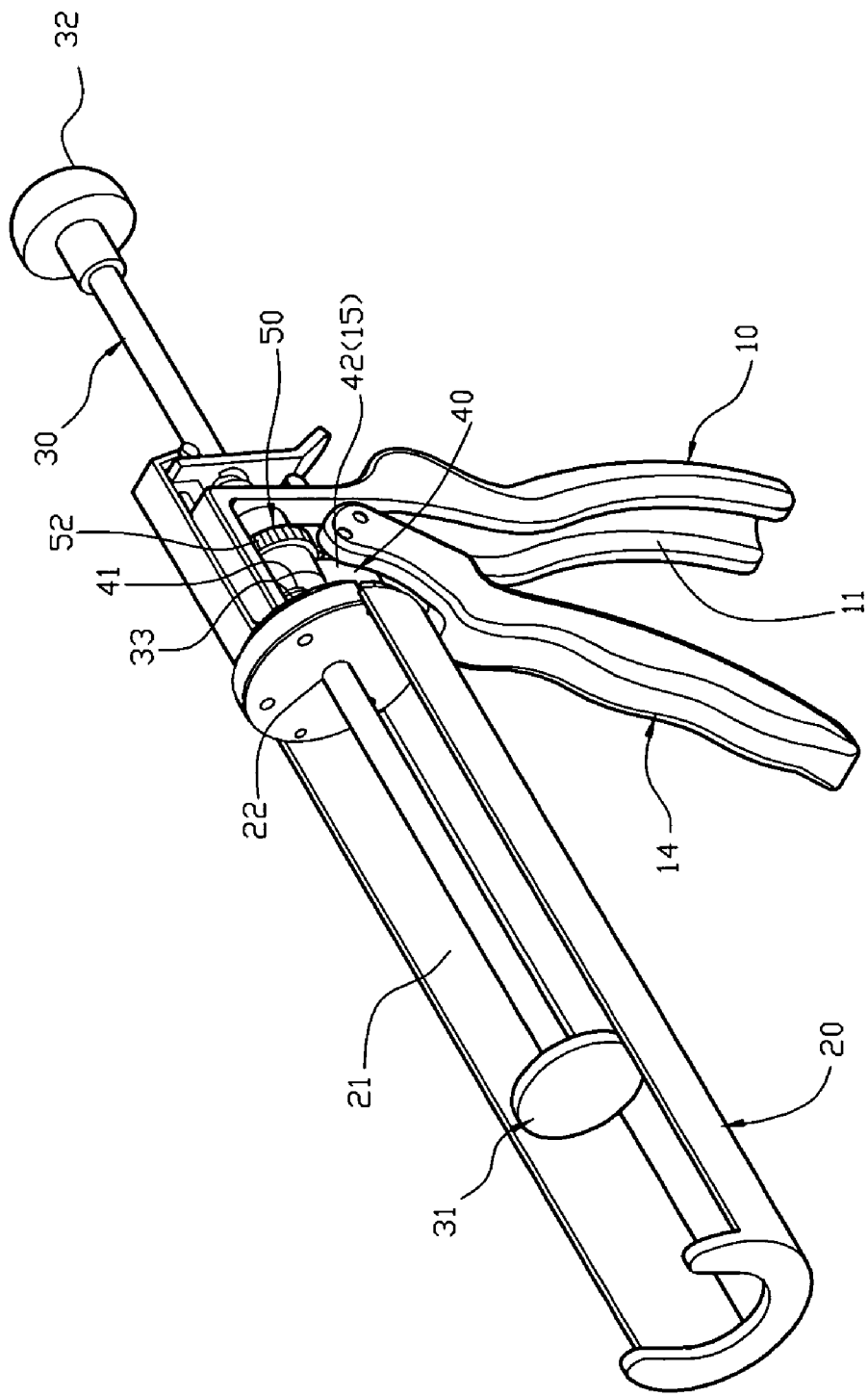
FIG. 1 is a perspective view of a caulking gun in accordance with the preferred embodiment of the present invention.
Figure 2:
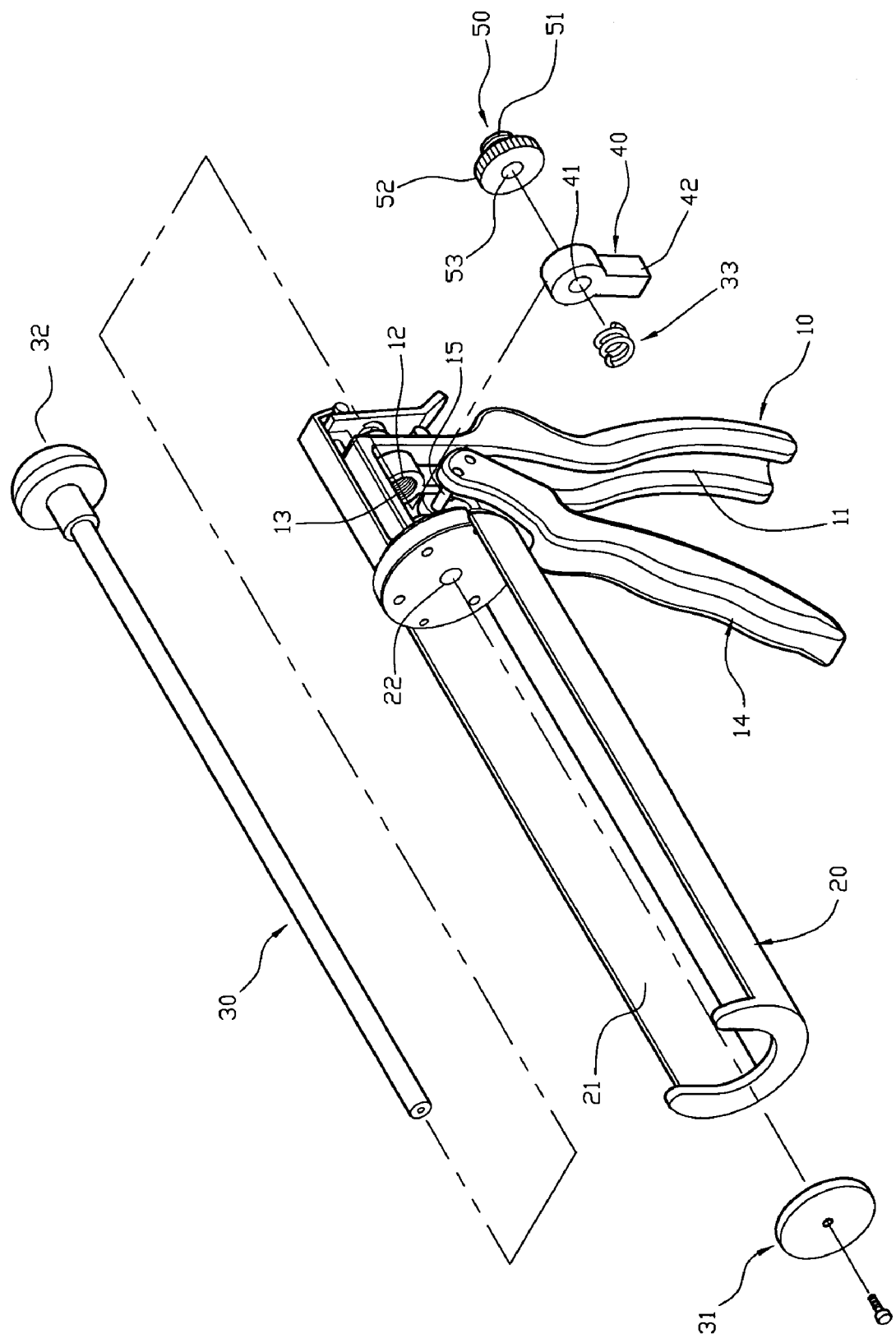
FIG. 2 is an exploded perspective view of the caulking gun as shown in FIG. 1.
Figure 3:
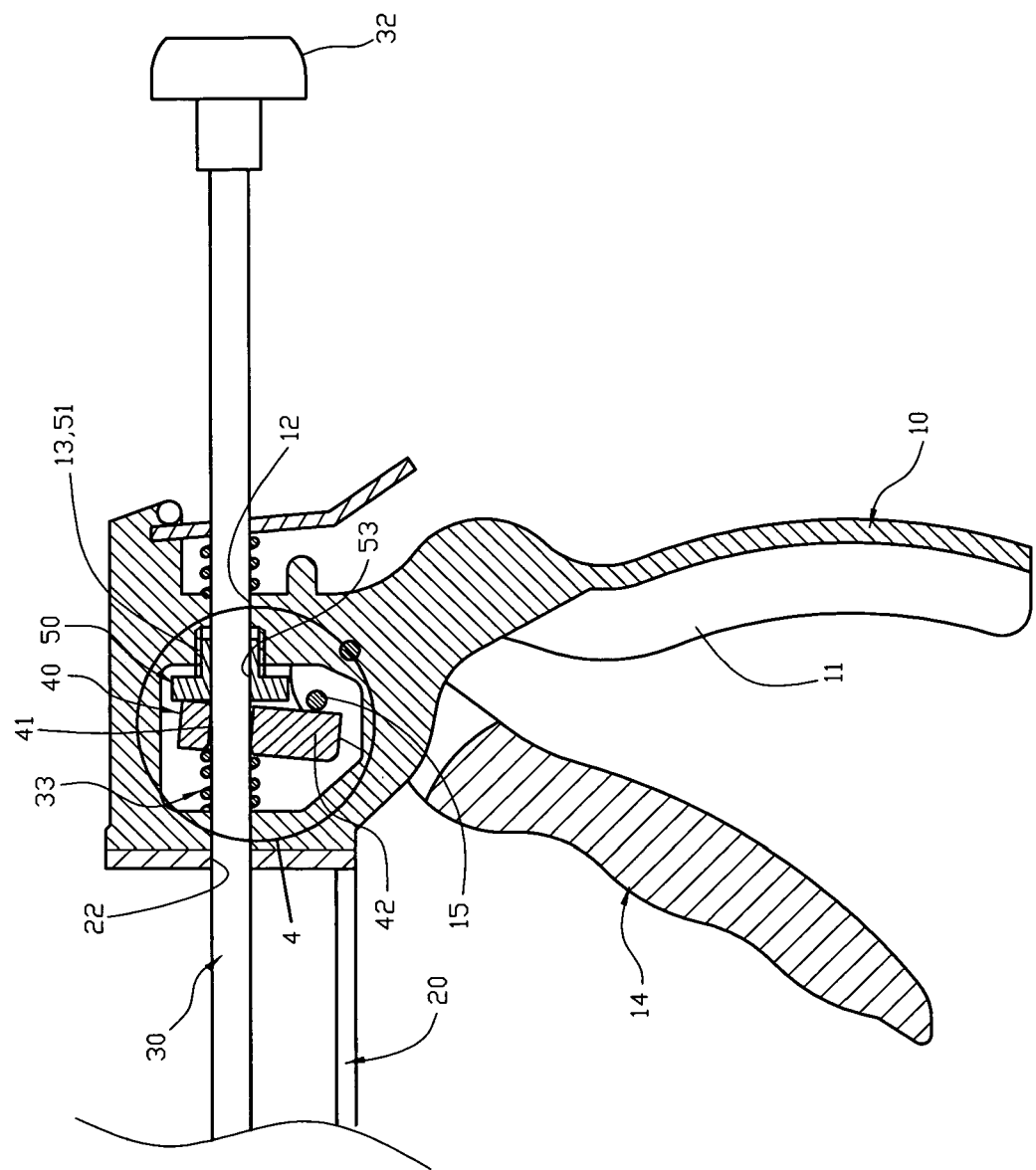
FIG. 3 is a partially cut-away plan cross-sectional view of the caulking gun as shown in FIG. 1.

Referring to the drawings and initially to FIGS. 1–4, a caulking gun in accordance with the preferred embodiment of the present invention comprises a gun body 10 having a first end formed with a mounting hole 12 and a second end formed with a handle 11, a push rod 30 movably mounted on the gun body 10 and extended through the mounting hole 12 of the gun body 10, a push plate 40 mounted on the push rod 30 in an inclined manner to push the push rod 30 to move and having a first end formed with a locking hole 41 rested on the push rod 30, an adjusting knob 50 rotatably and movably mounted in the mounting hole 12 of the gun body 10 and rested on a first side of the first end of the push plate 40, an elastic member 33 mounted on the push rod 30 and biased between the gun body 10 and a second side of the first end of the push plate 40, and a piston lever 14 pivotally mounted on the gun body 10 and having an end provided with a link 15 rested on a second end of the push plate 40 to push the push plate 40 to move.

The mounting hole 12 of the gun body 10 has a peripheral wall formed with a screw bore 13.

The adjusting knob 50 has a first end formed with a threaded rod 51 screwed into the screw bore 13 of the gun body 10 so that the adjusting knob 50 is movable relative to the gun body 10 to urge the first side of the first end of the push plate 40. The adjusting knob 50 has a second formed with a circular resting portion 52 rested on the first side of the first end of the push plate 40. The adjusting knob 50 has an inside formed with a through hole 53 mounted on the push rod 30.

The locking hole 41 of the push plate 40 has a circular shape and has a diameter greater than that of the push rod 30. The second end of the push plate 40 is formed with an urging portion 42 rested on the link 15 of the piston lever 14.

A barrel 20 is mounted on a side of the gun body 10 and has an inside formed with a receiving chamber 21. The barrel 20 has an end formed with a through hole 22 to allow passage of the push rod 30.

The push rod 30 has a first end provided with a pull knob 32 protruding outward from the gun body 10. A catch plate 31 is mounted on a second end of the push rod 30 and movably mounted in the receiving chamber 21 of the barrel 20.

In operation, referring to FIGS. 1–4, a cartridge (not shown) containing silicone is received in the receiving chamber 21 of the barrel 20 and rested on the catch plate 31. When the piston lever 14 is pressed, the link 15 of the piston lever 14 is urged on the urging portion 42 of the push plate 40 to push the push plate 40 to move forward in an inclined manner. Thus, the locking hole 41 of the push plate 40 is locked on the push rod 30 in a tilt manner to move the push rod 30 which moves the catch plate 31 to compress the cartridge. After the piston lever 14 is released, the push plate 40 is pushed by the restoring force of the elastic member 33 to move backward in a horizontal manner without moving the push rod 30. Thus, the push rod 30 and the catch plate 31 are moved forward successively by pressing the piston lever 14 repeatedly to compress the cartridge so as to squeeze the silicone outward from the cartridge for use.

Figure 6:
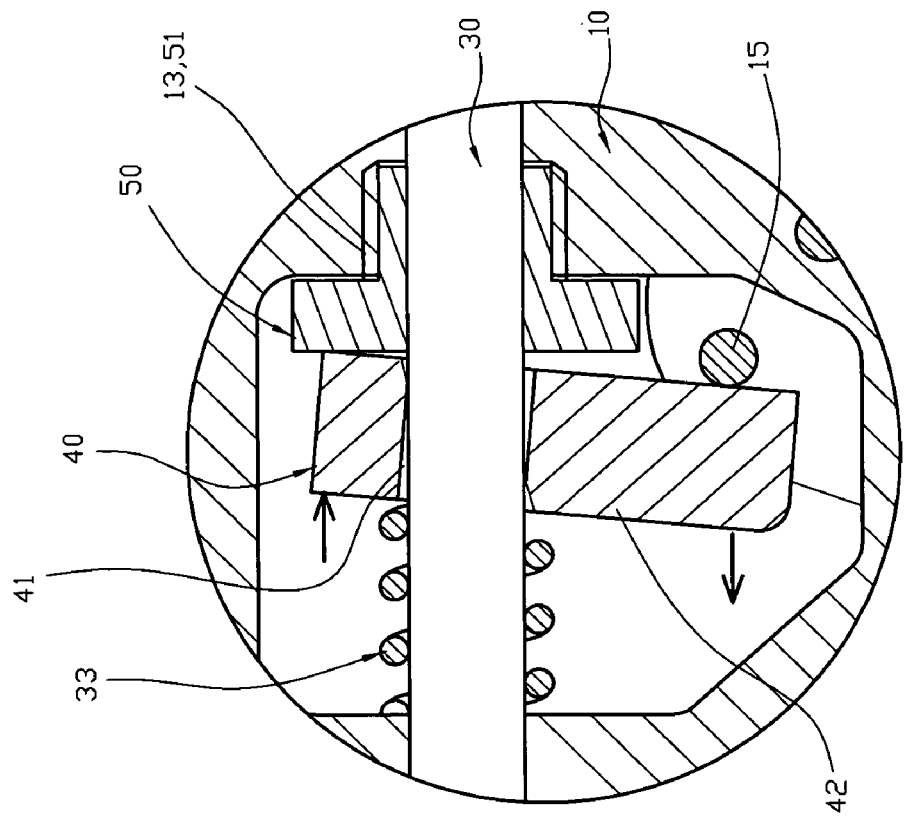
FIG. 6 is a locally enlarged view of the caulking gun taken along the circle 6 as shown in FIG. 5.
Figure 4:
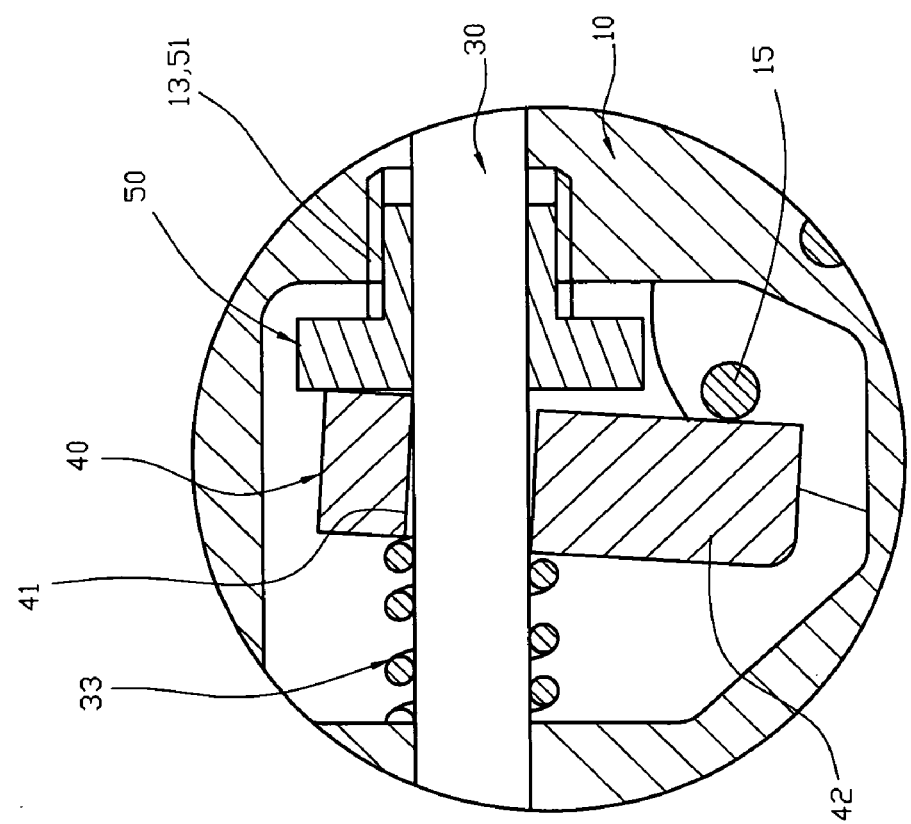
FIG. 4 is a locally enlarged view of the caulking gun taken along the circle 4 as shown in FIG. 3.
Figure 5:
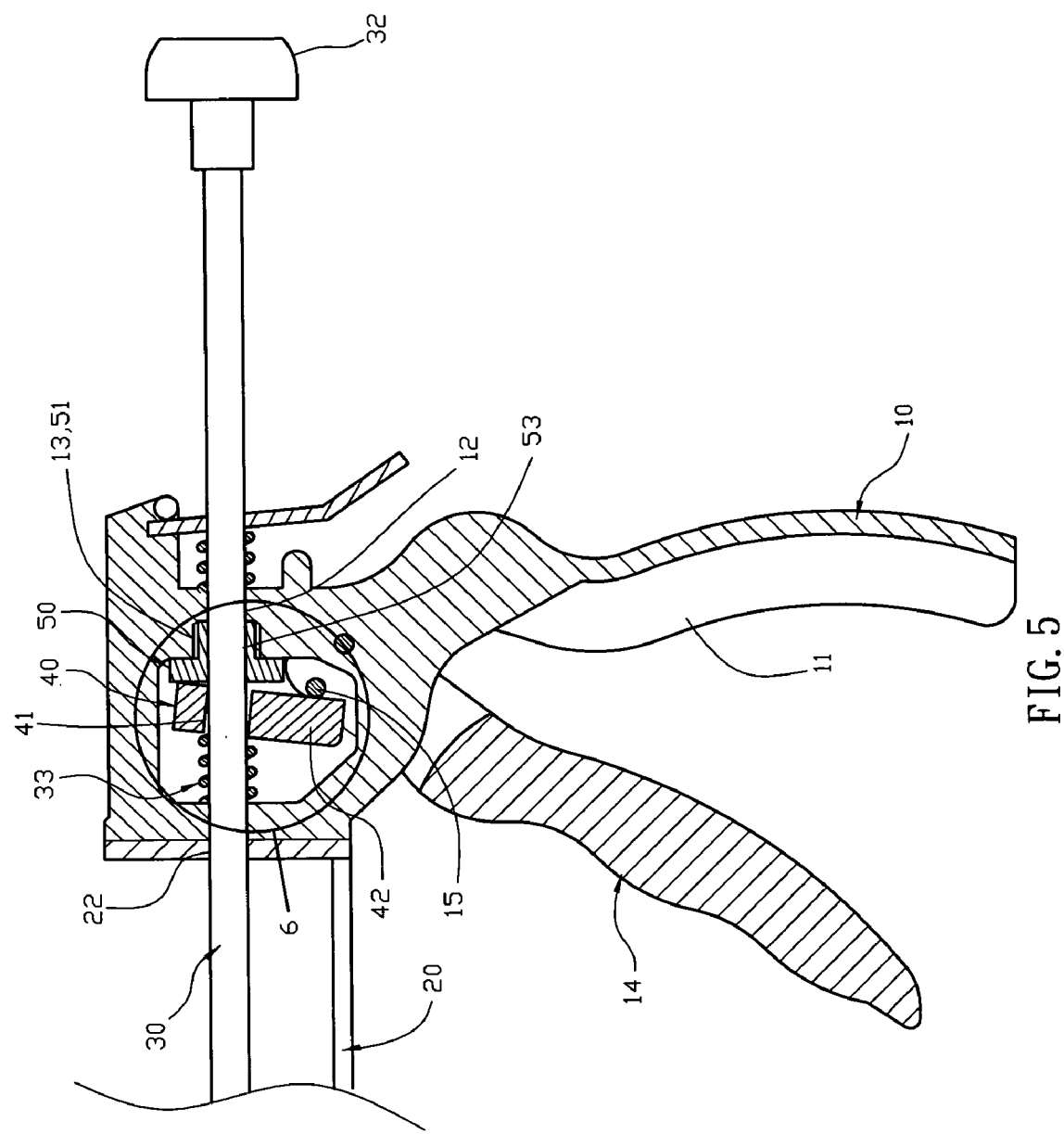
FIG. 5 is a partially cut-away plan cross-sectional view of the caulking gun as shown in FIG. 1.
Figure 7:
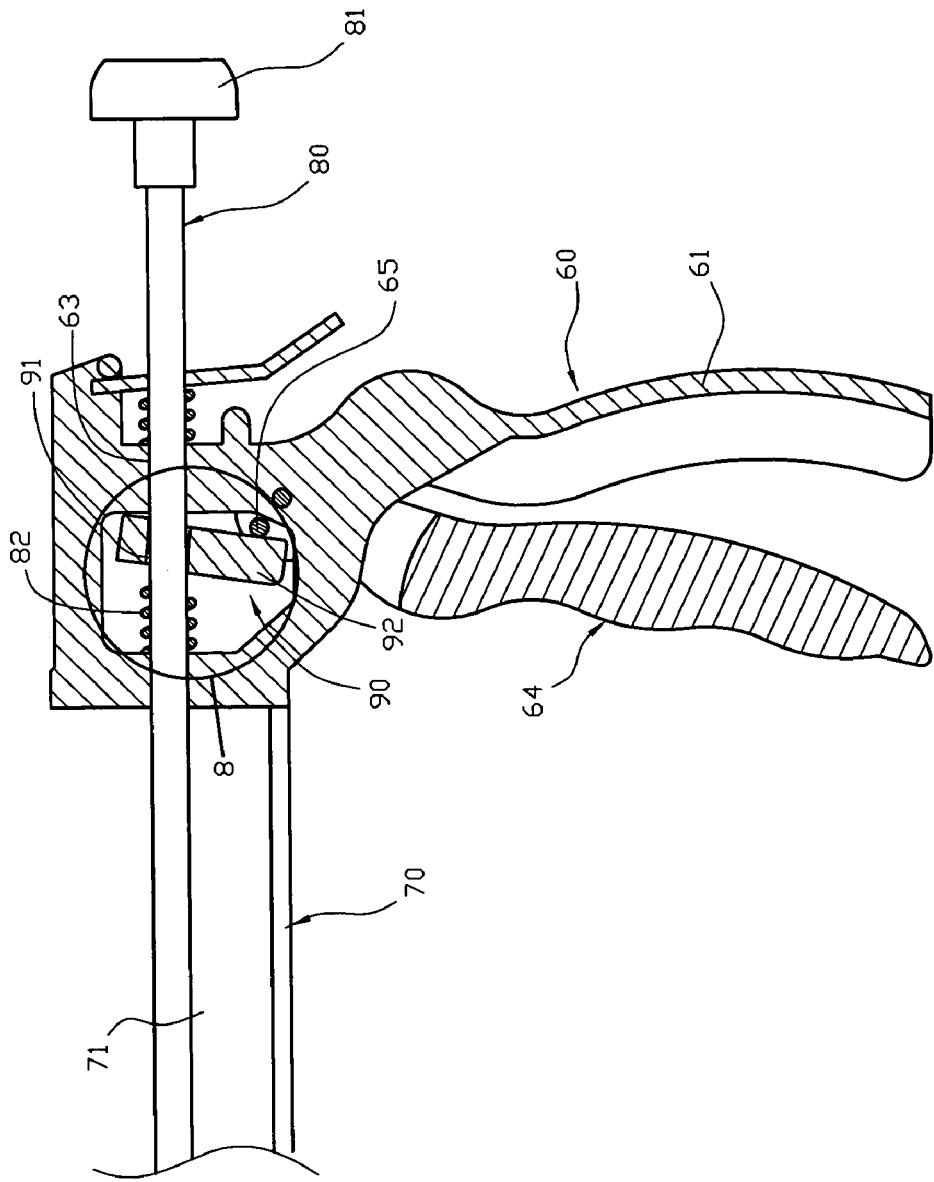
FIG. 7 is a partially cut-away plan cross-sectional view of a conventional caulking gun in accordance with the prior art.
Figure 8:
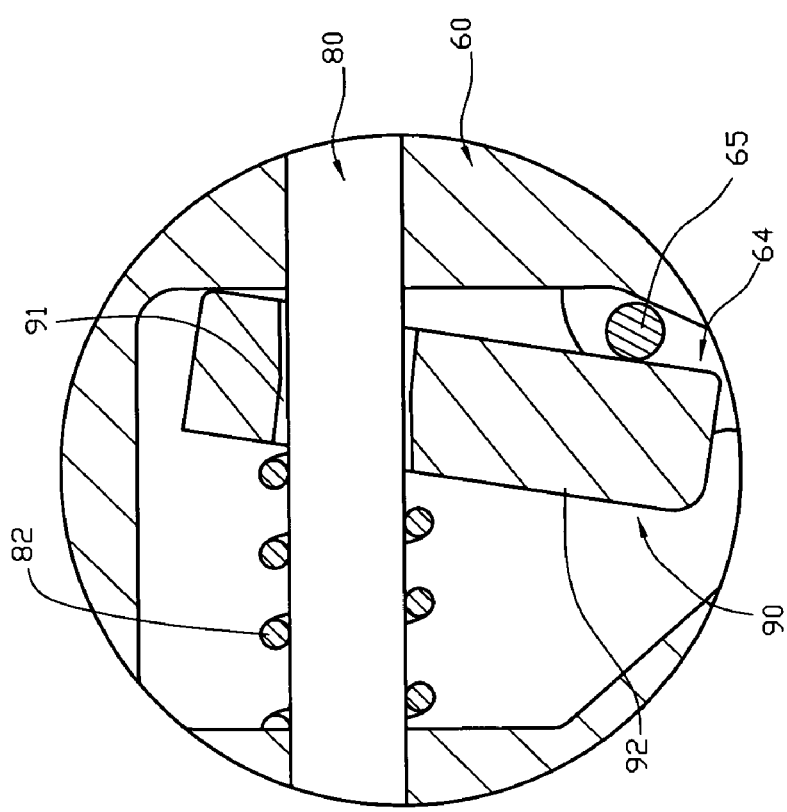
FIG. 8 is a locally enlarged view of the conventional caulking gun taken along the circle 8 as shown in FIG. 7.

Alternatively, referring to FIGS. 5 and 6, when the locking hole 41 of the push plate 40 is worn out during a long-term utilization, the diameter of the locking hole 41 of the push plate 40 is expanded, so that the locking hole 41 of the push plate 40 cannot lock the push rod 30 to move the push rod 30 any more. At this time, the adjusting knob 50 is rotated to move away from the push plate 40 to displace from the position as shown in FIG. 4 to the position as shown in FIG. 6 to increase the incline angle of the locking hole 41 of the push plate 40, so that the locking hole 41 of the push plate 40 is locked on the push rod 30 in a tilt manner again to lock and move the push rod 30.

Accordingly, the adjusting knob 50 is rotated to move away from the push plate 40 to increase the incline angle of the locking hole 41 of the push plate 40, so that the locking hole 41 of the push plate 40 is locked on the push rod 30 in a tilt manner to lock and move the push rod 30, without having to replace the push plate 40, thereby enhancing the lifetime of the caulking gun. In addition, the adjusting knob 50 is rotated to move away from the push plate 40 to increase the forward stroke of the push plate 40 or to move toward the push plate 40 to decrease the forward stroke of the push plate 40 so as to adjust the output flow rate of the silicone from the cartridge.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A caulking gun, comprising:
   a gun body having a first end formed with a mounting hole;
   a push rod movably mounted on the gun body and extended through the mounting hole of the gun body;
   a push plate mounted on the push rod in an inclined manner to push the push rod to move relative to the gun body and having a first end formed with a locking hole for slidably receiving the push rod therethrough;
   an adjusting knob having a rearward portion rotatably and movably mounted within the mounting hole of the gun body and a forward portion, a first side of the first end of the push plate being biased into engagement with the forward portion of the adjusting knob; and
   a piston lever pivotally mounted on the gun body and having an end provided with a link rested on a second end of the push plate to push the push plate for moving the push rod.

2. The caulking gun in accordance with claim 1, wherein the mounting hole of the gun body has a peripheral wall formed with a screw bore, and the reward portion of the adjusting knob is end formed with a threaded rod screwed into the screw bore of the gun body.

3. The caulking gun in accordance with claim 2, wherein the forward portion of the adjusting knob has a resting portion rested on the first side of the first end of the push plate.

4. The caulking gun in accordance with claim 3, wherein the resting portion of the adjusting knob has a circular shape.

5. The caulking gun in accordance with claim 1, wherein the adjusting knob is movable relative to the gun body to urge the first side of the first end of the push plate.

6. The caulking gun in accordance with claim 1, wherein the adjusting knob has an inside formed with a through hole mounted on the push rod.

7. The caulking gun in accordance with claim 1, wherein the locking hole of the push plate has a circular shape.

8. The caulking gun in accordance with claim 1, wherein the locking hole of the push plate has a diameter greater than that of the push rod.

9. The caulking gun in accordance with claim 1, wherein the second end of the push plate is formed with an urging portion rested on the link of the piston lever.

10. The caulking gun in accordance with claim 1, wherein the gun body has a second end formed with a handle.

11. The caulking gun in accordance with claim 1, wherein the adjusting knob is rotated to move away from the push plate to increase an incline angle of the locking hole of the push plate, so that the locking hole of the push plate is locked on the push rod in a tilted manner again to lock and move the push rod.

12. The caulking gun in accordance with claim 1, wherein the adjusting knob is rotated to move away from the push plate to increase a forward stroke of the push plate.

13. The caulking gun in accordance with claim 1, wherein the adjusting knob is rotated to move toward the push plate to decrease a forward stroke of the push plate.

14. The caulking gun in accordance with claim 1, further comprising an elastic member mounted on the push rod and biased between the gun body and a second side of the first end of the push plate.

* * * * *